(12) United States Patent
Metcalfe et al.

(10) Patent No.: US 11,432,684 B2
(45) Date of Patent: Sep. 6, 2022

(54) PROFI-CARTRIDGE APPARATUS AND METHODS OF USE THEREOF

(71) Applicants: Christian T. Metcalfe, Mercer Island, WA (US); Warren R. Kirsch, Palo Alto, CA (US); W. Davis Lee, Rockport, ME (US)

(72) Inventors: Christian T. Metcalfe, Mercer Island, WA (US); Warren R. Kirsch, Palo Alto, CA (US); W. Davis Lee, Rockport, ME (US)

( * ) Notice: Subject to any disclaimer, the term of this patent is extended or adjusted under 35 U.S.C. 154(b) by 0 days.

(21) Appl. No.: 16/999,061

(22) Filed: Aug. 21, 2020

(65) Prior Publication Data

US 2020/0375403 A1 Dec. 3, 2020

Related U.S. Application Data

(63) Continuation-in-part of application No. 15/125,434, filed as application No. PCT/US2016/050919 on Sep. 9, 2016, now abandoned.

(60) Provisional application No. 62/217,463, filed on Sep. 11, 2015.

(51) Int. Cl.
| | |
|---|---|
| *A47J 43/12* | (2006.01) |
| *B65D 83/68* | (2006.01) |
| *B65D 85/72* | (2006.01) |
| *B65D 83/42* | (2006.01) |
| *A23C 13/14* | (2006.01) |
| *B05B 11/00* | (2006.01) |

(Continued)

(52) U.S. Cl.
CPC ............... *A47J 43/12* (2013.01); *A23C 13/14* (2013.01); *B05B 9/0833* (2013.01); *B05B 11/0054* (2013.01); *B65D 83/425* (2013.01); *B65D 83/68* (2013.01); *B65D 83/752* (2013.01); *B65D 85/72* (2013.01); *A23C 2210/30* (2013.01)

(58) Field of Classification Search
CPC ...... A47J 43/12; A23C 13/14; A23C 2210/30; A23C 2270/10; B05B 9/0833; B05B 11/0054; B65D 83/425; B65D 83/68; B65D 83/752; B65D 85/72
See application file for complete search history.

(56) References Cited

U.S. PATENT DOCUMENTS

| | | | | |
|---|---|---|---|---|
| 4,526,730 A | * | 7/1985 | Cochran | B01F 23/23611 426/477 |
| 4,935,255 A | * | 6/1990 | Anderson | A23C 3/033 426/399 |

(Continued)

*Primary Examiner* — Vishal Pancholi
(74) *Attorney, Agent, or Firm* — Kevin H. Hazen; Hazen Patent Group, LLC (57) ABSTRACT

The invention comprises an apparatus and/or a method of use thereof for dispensing whipped cream, comprising: a profi including a pressure containment housing, a first receiving port integrated into the pressure containment housing, a dispensing port integrated into the pressure containment housing, and at least a first pressure cartridge containing at least a liquid form of nitrous oxide, where the pressure cartridge includes a pressure gas delivery port and where a connection between the receiving port and the pressure gas delivery port form: (1) a section of a pressure containment unit encompassing contents of the pressure containment housing and the pressure cartridge and (2) an open path between the pressure containment housing and the pressure cartridge.

7 Claims, 6 Drawing Sheets

(51) Int. Cl.
*B65D 83/14* (2006.01)
*B05B 9/08* (2006.01)

(56) References Cited

U.S. PATENT DOCUMENTS

| | | | | |
|---|---|---|---|---|
| 5,329,975 | A * | 7/1994 | Heitel | B65D 83/42 |
| | | | | 261/DIG. 7 |
| 7,100,799 | B2 * | 9/2006 | Gruenewald | A47J 43/121 |
| | | | | 222/399 |
| 9,227,827 | B1 * | 1/2016 | Scott | B67D 1/0418 |
| 2003/0170356 | A1 * | 9/2003 | Yuan | A23L 3/3445 |
| | | | | 426/313 |
| 2010/0221392 | A1 * | 9/2010 | Nakai | A47J 43/126 |
| | | | | 426/316 |
| 2011/0049193 | A1 * | 3/2011 | Muller Kubold | B67D 1/0412 |
| | | | | 222/399 |
| 2013/0340497 | A1 * | 12/2013 | Tata | C12G 1/06 |
| | | | | 73/1.06 |

* cited by examiner

PROFI-CARTRIDGE APPARATUS AND METHODS OF USE THEREOF

CROSS REFERENCES TO RELATED APPLICATIONS

This application is:
a continuation-in-part of U.S. patent application Ser. No. 15/125,434 filed Sep. 12, 2016, which is a national stage application under 35 U.S.C. § 371 and claims priority to international application no. PCT/US2016/050919, filed Sep. 9, 2016, which claims the benefit of U.S. provisional patent application No. 62/217,463 filed Sep. 11, 2015; and
is related to U.S. provisional patent application No. 61/953,160 filed Mar. 14, 2014 and U.S. provisional patent application No. 62/052,376 filed Sep. 18, 2014,
all of which are incorporated herein in their entirety by this reference thereto.

BACKGROUND OF THE INVENTION

Field of the Invention

The invention relates to a profi-cartridge apparatus and methods of use thereof.

Discussion of the Prior Art

Nitrous oxide, which is also known as dinitrogen monoxide, $N_2O$, and/or "laughing gas" and colloquially known as nitrous is classified by the United Nations Intergovernmental Panel on Climate Change as a potent greenhouse gas with a global warming potential over three hundred times that of carbon dioxide, $CO_2$. Nitrous oxide is the fourth most common greenhouse gas, behind water vapor, carbon dioxide, and methane.

Nitrous oxide is persistent in the atmosphere, with an average lifetime of one hundred twenty years, and reacts destructively with protective ozone in the stratosphere, which results in a reduction in ultraviolet light absorbance and a greater percentage of harmful incident ultraviolet light from the sun reaching the planet's surface. It follows that a reduction in the emission of nitrous oxide has significant positive long-term benefits to life and materials/structures on earth. Hence, compositions with a smaller percentage of nitrous oxide and/or methods used to reduce nitrous oxide emissions, such as in food preparation, are beneficial.

Nitrous oxide is commonly used to make whipped topping, such as a whipped cream. Whipped cream is used as an element of various food items, such as beverages, crepes, pancakes, and/or desserts. An estimated 500 million eight-gram nitrous oxide gas cartridges are used worldwide annually, resulting in the release of over four million metric tons of nitrous oxide, which has a global warming impact equivalent to 1.2 billion metric tons of carbon dioxide.

In addition, nitrous oxide, is a substance of abuse that is easy to obtain and difficult to detect. Huffing of nitrous oxide to achieve an analgesic, which is often referred to as a narcotic high, has become an abuse problem.

What is needed is a safe approach to making and/or dispensing product from a pressurized container.

SUMMARY OF THE INVENTION

The invention comprises a pressurized nitrous oxide cartridge apparatus and method of manufacture or use thereof.

BRIEF DESCRIPTION OF THE DRAWINGS

A more complete understanding of the present invention is derived by referring to the detailed description and described embodiments when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that are performed concurrently or in a different order are illustrated in the figures to help improve understanding of embodiments of the present invention.

DETAILED DESCRIPTION OF EXEMPLARY EMBODIMENTS

The invention comprises an apparatus and/or a method of use thereof for dispensing whipped cream, comprising: a profi including a pressure containment housing, a first receiving port integrated into the pressure containment housing, a dispensing port integrated into the pressure containment housing, and a first pressure cartridge containing at least a liquid form of nitrous oxide, where the pressure cartridge includes a pressure gas delivery port and where a connection between the receiving port and the pressure gas delivery port form: (1) a section of a pressure containment unit encompassing contents of the pressure containment housing and the pressure cartridge and (2) an open path between the pressure containment housing and the pressure cartridge.

This disclosure provides compositions of nitrous oxide mixtures, and methods for using the same, including in food preparation to generate aerated food products and/or aerated compositions.

Generally, the generated compositions reduce the amount of nitrous oxide required versus traditional methods using pure nitrous oxide. For example, the compositions reduce the amount of nitrous oxide used to prepare an equivalent amount of aerated food product, while retaining aeration and at least one of and preferably all of volume, flavor, and an aroma profile. The mixtures and methods reduce the amount of nitrous oxide emissions generated in the preparation of various products.

Herein, a z-axis is aligned with gravity, where an x-axis and a y-axis form a plane perpendicular to the z-axis.

Figure 1A:
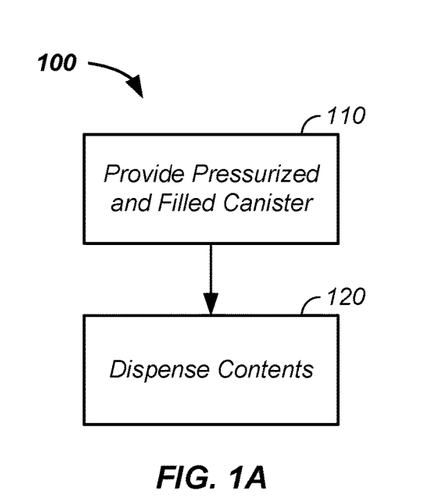
FIG. 1A and FIG. 1B illustrate a method of use of a pressurized container and whipped cream dispenser, respectively.

Referring now to FIG. 1A, a method of dispensing a product 100 from a pressurized container is illustrated. Generally, the method of dispensing a product 100 comprises the steps of providing a pressurized and product constituent filled container 110 and a step of dispensing contents 120 from the pressurized container.

Herein, without loss of generality and for clarity of presentation, food products and whipped cream are used as non-limiting examples of products dispensed by the taught apparatus and methods of use thereof. Again, for clarity of presentation and without loss of generality, examples are used for preparation, storage, and/or dispersion of the nitrous oxide mixtures, with particular examples to whipped cream. However, more generally, the invention relates to preparation, storage, and/or dispersion of any composition containing nitrous oxide and/or a second gas, such as a noble gas, from a pressurized container.

Figure 1B:
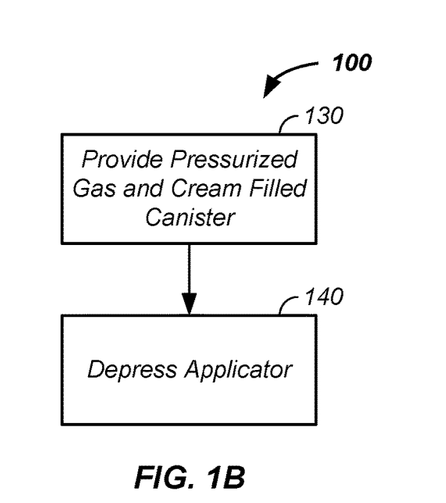

Referring now to FIG. 1B, the method of dispensing a product 100 is illustrated where steps include: providing a pressurized gas and cream filled canister 130 and depressing an applicator mechanism, such as a trigger or button, to dispense the product 140.

Figure 2:
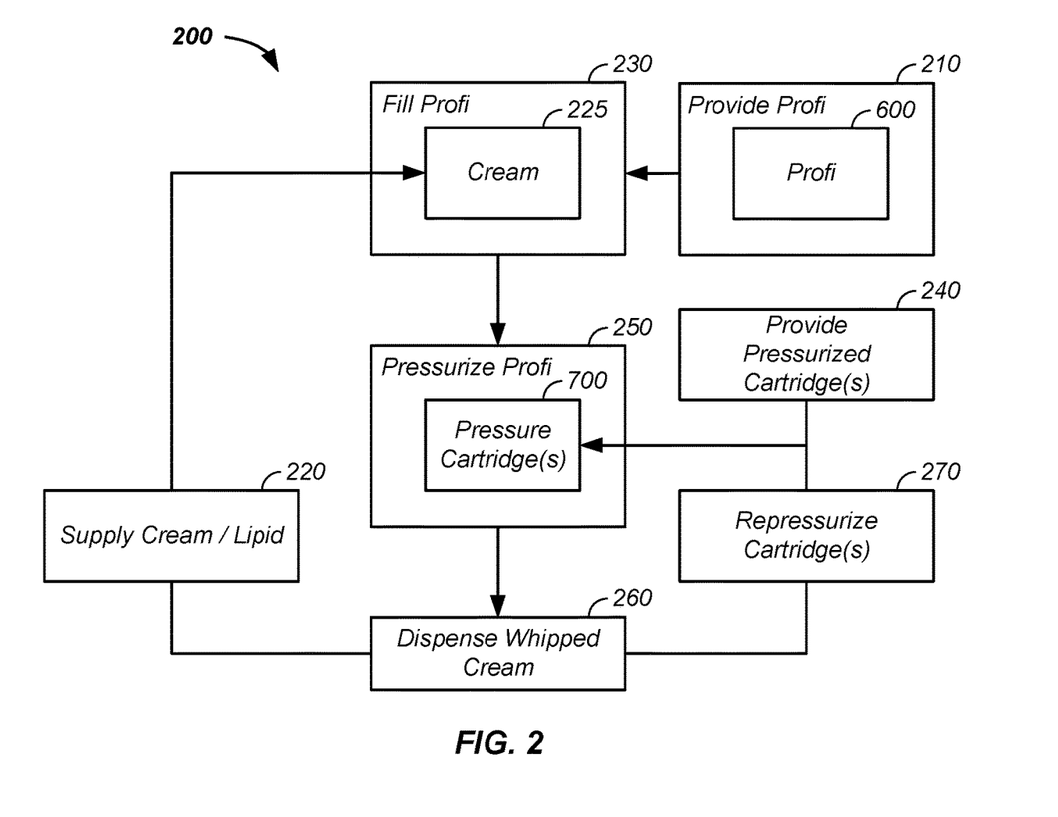
FIG. 2 illustrates assembly and use of a profi or reusable pressure vessel.
Figure 3:
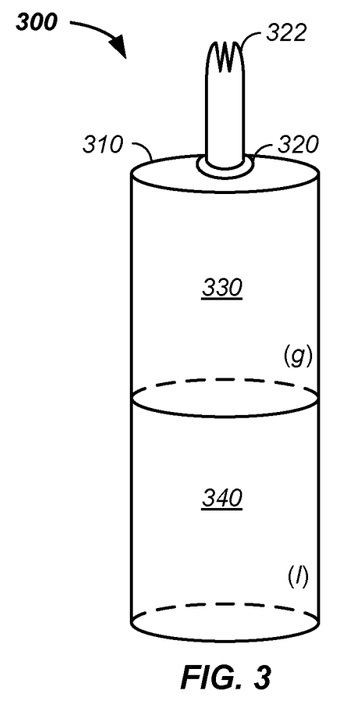
FIG. 3 illustrates a whipped cream canister.

Referring now to FIG. 1B, FIG. 2, and FIG. 3, a whipped cream canister 300 is distinguished from a profi 600. For example, the U.S. Department of Transportation (DOT) carefully regulates the pressure of shipped canisters, such as a whipped cream canister 300, such as purchased at a grocery store to contain a maximum pressure of 200 pounds per square inch (psi). Indeed, whipped cream canisters sold in grocery stores are governed by special permits limiting the canisters to 150 psi prior to leaving a production facility. Further, whipped cream is dispensed from the whipped cream canister 300 until one or more of the cream and the nitrous oxide in the whipped cream canister 300 is depleted. The whipped cream canister 300 is not refillable. In stark contrast, the profi 600 comprises a container containing, at initial dispensation of a product, a pressure in excess of 200 psi, such as above 200, 300, 500, 700, 740, 750, 760, 775, 1000, or 2000 psi. The profi 600 is optionally and preferably refillable, such as with cream 225 and the use of a removeable/replaceable pressurized cartridge 700. Optionally and preferably, the profi 600 is refilled and/or repressurized by an individual outside of a manufacturing facility, such as at a coffee shop, restaurant, or a personal residence.

Referring again to FIG. 2, a method of use of a profi 200 is illustrated. The method of use of a profi 600 includes one or more of the steps of: providing a profi 210, supplying a cream/lipid 220, filling the profi 230, such as with the cream 225, pressurizing the profi 250, and dispensing the whipped cream 260, or other product. Optionally and preferably, the method of use of the profi 200 includes one or more of the steps of: providing a pressurized cartridge 240 and/or repressurizing an already used cartridge 270 and using the pressure cartridge 700 in the step of pressurizing the profi 250. Stated again, a profi 600 is optionally charged with a new or refilled pressure cartridge 700. The pressure cartridge 700 is further described, infra.

A whipped cream canister 300 contains a maximum pressure of 200 psi and is a single use item, until one or more of the nitrous oxide and/or cream is dispensed. In stark contrast, a profi 600 uses a pressure cartridge 700 to charge the profi 600 with a gas containing nitrous oxide, where the pressure cartridge 700 and/or the profi is reusable. The pressure cartridge 700 includes an outer pressure wall 710 that contains an internal, typically pressurized, volume. The pressure cartridge optionally and preferably contains a pressure gas delivery port that connects to receiving/charging port of the profi 700. The pressure gas delivery port is optionally opened when charging the profi in either a temporary, permanent, or resealable manner, such as with a valve and/or a pressure regulator.

Referring now to FIG. 3, the whipped cream canister 300 is further described. The whipped cream canister includes a low pressure containment housing 310 and an interface 320 to an applicator tip 322. The low pressure containment housing 310 contains a gas volume, such as nitrous oxide 352, at a maximum pressure of 200 psi and a liquid volume 340, which included the cream 225. To dispense whipped cream 262 from the whipped cream canister 300, the interface 320 is temporarily opened, which allows the internal nitrous oxide 352 to dispense along with the cream 225. The sudden change in pressure from an internal pressure within the low pressure containment housing to a still lower atmospheric pressure causes dispensed nitrous oxide to expand, which expands the cream 225 into a form of whipped cream 262.

Figure 4A:
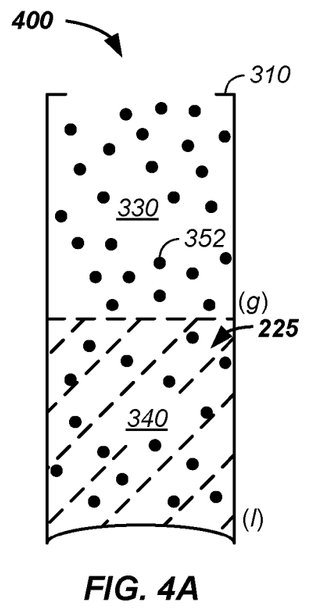
FIG. 4A, FIG. 4B, and FIG. 4C illustrate a pressure filled container containing one, two, and three gases, respectively.
Figure 4B:
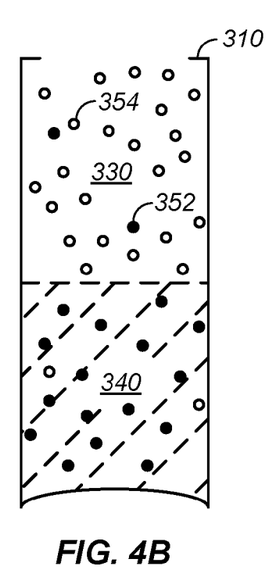
Figure 4C:
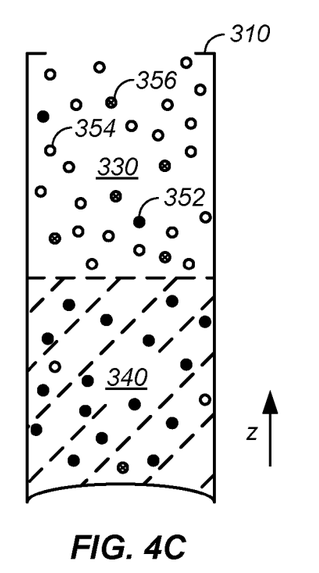

Referring now to FIGS. 4(A-C), constituents 400 of the low pressure whipped cream canister 300 and/or the profi 600 are described. For clarity of presentation and without loss of generality, as illustrated, the constituents 400 are contained in the low pressure containment housing 310. However, the constituents are optionally contained, in a high pressure containment housing 610 of the profi 600. In reference to the description of FIGS. 4(A-C), the term housing is used to refer to both the low pressure containment housing 310 of the whipped cream canister 300 and the high pressure containment housing 610 of the profi 600. Herein, the clause canister/cartridge refers to the whipped cream canister 300, the high pressure containment housing 610, and/or the pressure cartridge 700 used to charge the profi 600.

Pressurized Housing Gases

Referring now to FIG. 4A, a first case of a single gas, such as nitrous oxide 352, and cream 225 in the housing is illustrated. In this first case, the constituents 400 in the housing include: a gas volume 330 and a liquid volume 340. The gas volume 300 contains nitrous oxide 352. The liquid volume 340 contains the cream 225 and nitrous oxide 352 dissolved in the cream 225. In this first case, nitrous oxide is at least 95, 96, 97, 98, 99, 99.5, and/or 99.9 percent of the gas in the housing. The balance of the gas is outgassing from the cream and/or impurities, in the nitrous oxide and/or ambient air, making their way into the housing in a manufacturing step.

Referring now to FIG. 4B, a second case of two gases, such as nitrous oxide 352 as a first gas and a second gas, along with cream in the housing is illustrated. In this second case, the constituents 400 in the housing still include: a gas volume 330 and optionally a liquid volume 340. The gas volume 330 includes a first gas, such as nitrous oxide, and a second gas intentionally introduced into the housing, not an accidental inclusion of atmospheric gas, during a pressurization of the housing step. For example, the first gas and the second gas are intentionally used to charge the whipped cream canister 300 at a manufacturer or the first gas and the second gas are intentionally introduced in the profi pressurization step 250, described supra. The first gas is optionally and preferably nitrous oxide 352. The second gas is ambient air, such as air in the earth's atmosphere, hydrogen, helium, nitrogen, carbon dioxide, neon, argon, krypton, or xenon. A preferred second gas is argon. Relative partial pressures, volumes, mol content, and/or concentrations of the first gas and second gas are further described, infra. In this second case, environmental air is not intentionally introduced into the housing, but may make up an impurity of up to 3, 2, 1, 0.5, 0.25, 0.1, or 0.01 percent by volume and/or by mass.

Figure 6A:
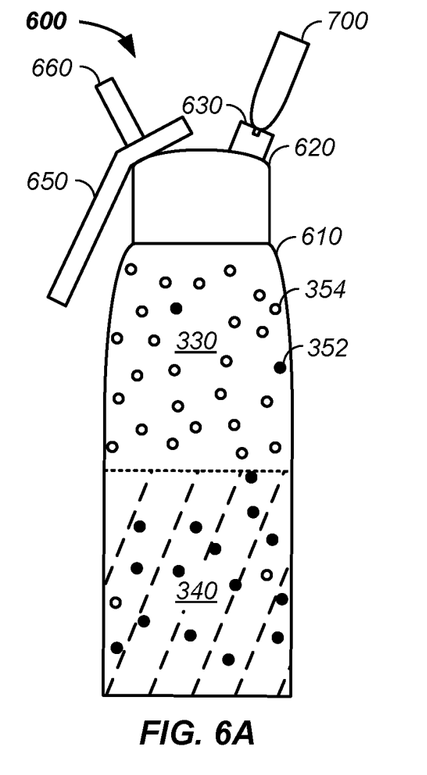
FIG. 6A and FIG. 6B illustrate profis.

Still referring to FIG. 4B, the two gases introduced into the housing are further described in terms of the presence of the cream 225. For clarity of presentation and without loss of generality, the first gas in this example is nitrous oxide 352 and the second gas is a noble gas, such as argon 354. Nitrous oxide 352 is soluble in fats and/or lipids, such as are present in the cream 225. Argon 354 is relatively insoluble in the cream 225. Thus, as illustrated, the concentration of nitrous oxide 352 falls in the gas volume 330 above the cream 225 while the argon 354 remains in high concentration in the gas volume 330/headspace of the container. As a result, inhalant abuse or huffing of the nitrous oxide through dispensing the gases from the housing in an upright position, a proper inverted position is used to dispense whipped cream, is ineffective for a high as the nitrous oxide concentration in the headspace is diminished as the nitrous oxide resides in the cream 225. Discussion of the percentage of nitrous oxide in the headspace and cream are provided, infra. In this second example, the pressurized argon 354 functions to eject the cream 225 and dissolved nitrous oxide when the housing is used in a proper inverted orientation, where the liquid volume 340 covers an entrance to a delivery port, such as a dispensing port. In FIG. 6A, further described infra, the dispensing port 660 is further described.

In FIG. 3, the dispensing port of the whipped cream canister 300 is the an exit through which the cream 225 passes during use to atmosphere, such as through the interface 320 and the applicator tip 322.

Referring now to FIG. 4C, three gases are optionally introduced into the housing, canister, and/or cartridge. For clarity of presentation and without loss of generality, in this example the first gas is nitrous oxide 352, the second gas is argon 354, and the third gas is nitrogen 356, though any gases are optionally used. As illustrated, the nitrous oxide permeates/dissolves into the cream 225/liquid volume 340/liquid phase while the argon 354 and the nitrogen 356 remain primarily in the headspace/gas volume 330. Further, the analgesic effect of nitrous oxide follows a logarithmic scale, thus reducing nitrous oxide in the headspace above the cream is significantly amplified when it comes to reduction in the analgesic effect for the huffer. As a result, if huffed, the huffer is huffing the non-high inducing gases of argon 354 and nitrogen 356, while if the canister/cartridge is properly inverted, the whipped cream is dispensed as the product is intended. Generally, any number n of gases are introduced into the canister/cartridge/profi, where n is a positive integer, such as 2, 3, 4, 5, 6, 7, or more. Optionally and preferably, the concentration of each gas is greater than 0.001, 0.01, 0.1, 1, 2, or 3 percent. Generally, a preferred concentration of each gas exceeds the concentration of that gas in the earth's atmosphere as adjusted for pressure. Stated again, generally the second, third, fourth, . . . , $n^{th}$ gas is present at a concentration above atmospheric air compressed to the pressure in the canister, cartridge, and/or low pressure containment housing 310 of the whipped cream canister 130, the high pressure containment housing 610, and/or the profi 600. Hence, the concentration of each gas in the canister/cartridge exceeds a concentration obtained through the accidental inclusion of atmospheric air in the manufacturing/pressurization/charging process, such as in the step of providing a pressurized gas and cream filled canister 130 and/or the step of pressurizing the profi 250.

Optionally, the filled canister 130 is a sealed can/soda can/beverage can, such as dispensed from a vending machine, which is opened by the user just prior to drinking a contained beverage. For instance, the act of opening the sealed can uses a pop top or a lid that is removed by unscrewing a cap. Generally, the sealed can is packaged using any of the 1, 2, 3, or more gases, described supra, in combination with the beverage, where the 1, 2, 3, or more gases are optionally and preferably dissolved into the beverage at time of production and form a headspace, such as in equilibrium with the beverage prior to the user opening the sealed can.

Atmospheric and Compressed Atmosphere Concentration of Gases

This section details maximum atmospheric gas concentrations intentionally and/or accidently introduced as an impurity into the canister/cartridge.

The Earth's atmosphere is at one atmosphere (atm) pressure. Atmosphere is optionally placed in the low pressure containment housing 310 of the whipped cream canister 130 or the high pressure containment housing 610 of the profi 600 as an impurity and/or is intentionally used as one of the one or more pressurizing gases. In any case, the maximum amount of any environmental air constituent is a multiple of the environmental air concentration, where the multiple is the maximum pressure in atmospheres in the housing at time of filling. A relationship of housing pressure to atmospheres is provided in Table 1.

TABLE 1

Canister and Cartridge Pressures

| Housing Type | Condition | psi | atm |
|---|---|---|---|
| Canister | Initial Filling Pressure | 175 | 11.9 |
| Canister | Maximum Pressure* | 200 | 13.6 |
| Cartridge | N$_2$O phase change minus 25 psi | 725 | 49 |
| Cartridge | N$_2$O phase change | 750 | 51 |
| Cartridge | N$_2$O phase change plus 25 psi | 775 | 53 |
| Cartridge | Optional Filling Pressure | 1,000 | 68 |
| Cartridge | Optional Filling Pressure | 2,000 | 136 |

*as allowed by the U.S. Department of Transportation

It follows, that the maximum concentration of a component of the atmosphere in the whipped cream canister 130 or high pressure containment housing 610 is the atmospheric concentration times the initial atmospheric pressure of the whipped cream canister 130 or high pressure containment housing 610.

The Earth's atmosphere contains many components. The concentration of selected gases in the Earth's atmosphere is provided in Table 2 along with the maximum pressure of the component at 200 psi or 13.6 atm, the highest pressure of the whipped cream canister 300 allowed to be shipped by the U.S. Department of Transportation. For instance, the highest possible pressure of xenon in the whipped cream canister 130 by compressing atmospheric air into the canister is 1.18 ppm (0.087 ppm*13.6) at 200 psi or 13.6 atm, the highest pressure allowed by the U.S. Department of Transportation. Thus, a concentration of greater than 1.18 ppm xenon in the whipped cream canister 13.6 means that the manufacturer had to purposely add xenon to the canister, where the added gas containing xenon has a xenon concentration higher than naturally occurring xenon concentration in air/atmosphere. Like calculations reveal if the compressed gas used to fill the whipped cream canister 130 or profi 600 exceeds concentrations found in earth's atmosphere.

TABLE 2

Atmospheric and Compressed Atmospheric Gas Concentrations.

| Gas | Atmospheric Concentration (Percent) | Atmospheric Concentration (ppm) | Concentration at 13.6 atm (ppm) |
|---|---|---|---|
| Nitrogen | 78.084 | 780,790 | 10,618,744 |
| Oxygen | 20.946 | 209,445 | 2,848,452 |

TABLE 2-continued

Atmospheric and Compressed Atmospheric Gas Concentrations.

| Gas | Atmospheric Concentration (Percent) | Atmospheric Concentration (ppm) | Concentration at 13.6 atm (ppm) |
|---|---|---|---|
| Argon | 0.934 | 9,339 | 127,010.4 |
| Carbon Dioxide | 0.041 | 404 | 5,490 |
| Neon | 0.0018 | 18.21 | 247 |
| Helium | 0.00052 | 5.24 | 71.3 |
| Krypton | 0.0001 | 1.14 | 15.5 |
| Hydrogen | 0.00005 | 0.5 | 6.8 |
| Methane | 0.000187 | 0.5 | 6.8 |
| Xenon | 0.0000087 | 0.087 | 1.18 |

Several examples are provided as to the contents of the cartridge/canister and/or the profi 600.

Example I

Referring still to FIG. 4C and Table 2, in a first example: for two, three, four, or more gases introduced into the cartridge/canister whipped cream canister 130, and/or the profi 600, an optional and preferred concentration of each gas is greater that the concentration of each respective gas in the atmosphere at 200 psi or 13.6 atm of pressure, as listed in column 4 of Table 2.

Example II

Referring again to FIG. 4B, in a second example, for two gases introduced into the cartridge/canister whipped cream canister 130, and/or the profi 600, optionally and preferably, the first gas is nitrous oxide and the second gas is air or the first gas is nitrous oxide and the second gas is selected from column 1 of Table 2.

Example III

Referring again to FIG. 4C, in a third example, three, four, or more gases are introduced into the cartridge/canister whipped cream canister 130, and/or the profi 600, where optionally and preferably the first gas is nitrous oxide, the second gas is selected from column 1 of Table 2, and the third gas is selected from column 1 of Table 2.

Example IV

Referring again to FIG. 4C, in a fourth example, for three, four, or more gases introduced into the cartridge/canister whipped cream canister 130, and/or the profi 600, optionally and preferably the first gas is nitrous oxide, the second gas is selected from column 1 of Table 2, and the third gas is air.

Example V

Referring again to FIG. 4C, in a fifth example, for four or more gases introduced into the cartridge/canister whipped cream canister 130, and/or the profi 600, optionally and preferably, the first gas is nitrous oxide, the second gas is selected from column 1 of Table 2, the third gas is selected from column 1 of Table 2, and the fourth gas is air.

Proper/Improper Use of Canister/Cartridge

Figure 5A:
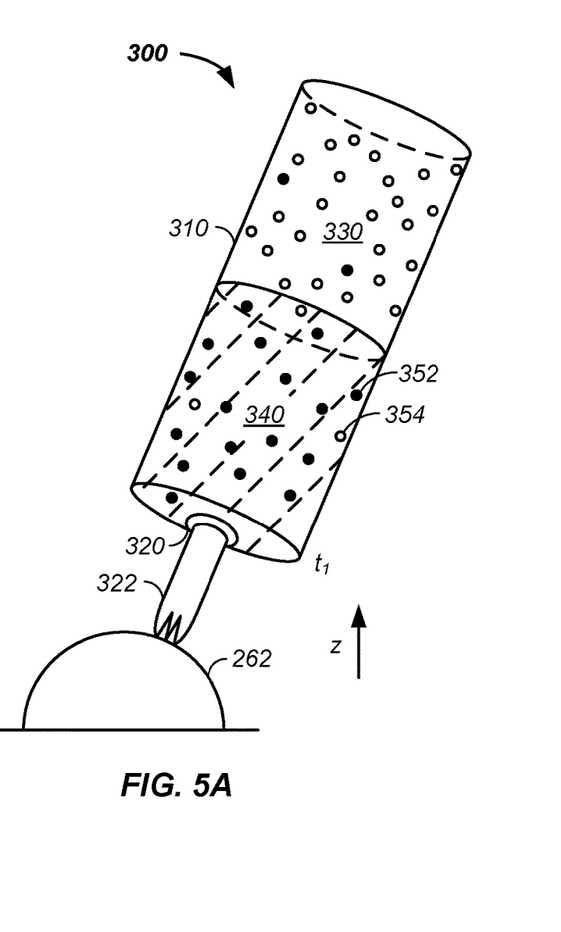
FIG. 5A and FIG. 5B illustrate a pressurized container in two orientations.
Figure 5B:
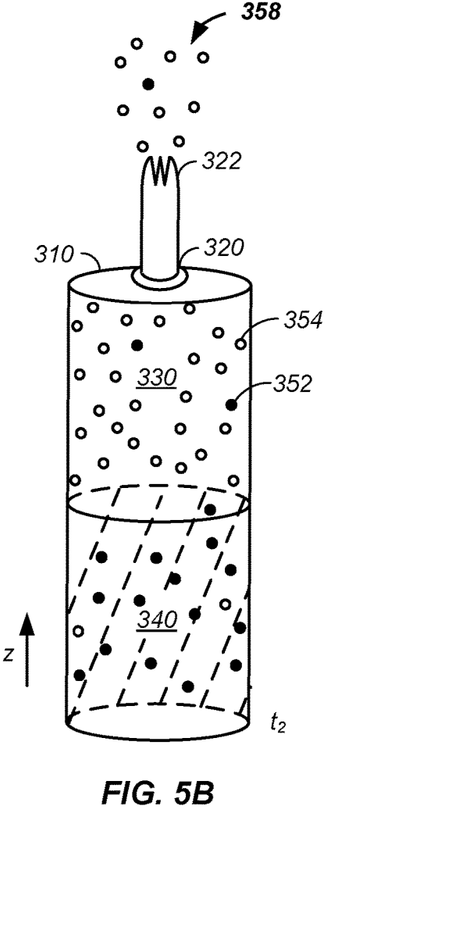

Referring now to FIG. 5A and FIG. 5B, the whipped cream canister 300 is illustrated in a proper whipped cream dispensing orientation and an improper huffing orientation, respectively. In both the dispensing orientation and the huffing orientation, the liquid volume 340 is pulled by gravity, z-axis, downward and the lower density gas volume 330 rises above the lower liquid volume. Thus, referring now to FIG. 5A, when the whipped cream canister 300 is orientated in the dispensing orientation and the can is activated, opened to atmosphere via the applicator tip 322, whipped cream 262 is dispensed via the dispensing port immersed in the liquid volume 340. Further, referring now to FIG. 5B, when the whipped cream canister 300 is orientated in a huffing orientation, where the dispensing port is immersed in the air volume 330, the less dense gas volume 330 is dispensed. As illustrated, in the huffing orientation, the nitrous oxide is dissolved into the cream in the liquid volume 340 and the gas volume 330 is dominated by the non-soluble gas, argon 354. More generally, the gas volume 340 contains any one, two, three, or more of nitrogen, oxygen, argon, carbon dioxide, neon, helium, krypton, hydrogen, methane, xenon, atmosphere, and a noble gas, while the high inducing nitrous oxide remains dominantly dissolved in the cream 225 and/or is in the liquid volume, such as more than 50, 60, 70, 80, 90, or 95 percent of the nitrous oxide, by mass. FIG. 5A and FIG. 5B illustrate the gas volume 330 rising above the liquid volume 340; the same logic of dispensing whipped cream in the inverted dispensing orientation and dispensing non-high inducing gases in the upright huffing orientation is applied to the high pressure containment housing 610 or the profi 600.

Profi

Figure 6B:
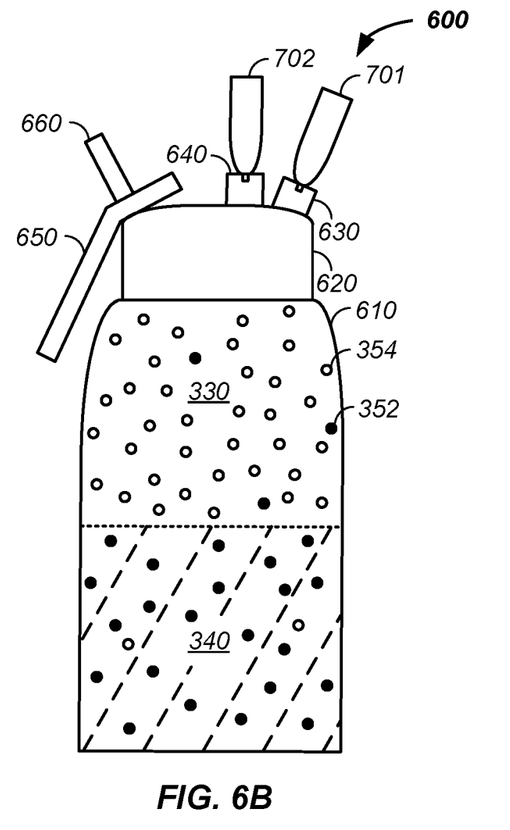
Figure 7:
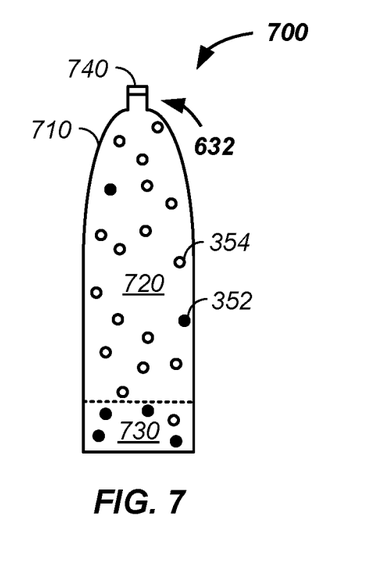
FIG. 7 illustrates a pressurized cartridge.

Referring now to FIG. 6A, FIG. 6B, and FIG. 7, the profi 600 is further described. Generally, as described, supra, the profi 600 includes a high pressure containment housing 610 that is pressurized using a replaceably attached pressure cartridge 700, such as attached by an end user. During use, cream 225 in the liquid volume 340 of the high pressure containment housing 610 is dispensed when the profi 600 is held in an inverted dispensing orientation and the high pressure containment housing 610 is temporarily opened to a lower pressure, such as atmospheric pressure, such as via the dispensing port.

Referring now to FIG. 6A, the pressure containment elements of the profi 600 are further described. Generally, the high pressure containment housing 610 of the profi 600 contains the liquid volume 340, such as the cream 225 and dissolved nitrous oxide as described above, and the gas volume 330, such as the less soluble gases of argon, nitrogen, and the like as described above. Before pressurization, the liquid contents of the profi are added, such as the cream 225 and any optional additive as further described, infra. As illustrated, the high pressure containment housing 610 is attached to a lid 620, such as a removable lid attached as a thread on lid. Optionally, the lid is hingedly attached to the high pressure containment housing. Generally, the high pressure containment housing 610 contains any sealable/ resealable opening for adding the contents, such as the cream 225.

Still referring to FIG. 6A and referring again to FIG. 7, the pressurization elements of the profi 600 are further described. Generally, the pressure cartridge 700 is attached to the profi 600 and the higher pressure in the pressure cartridge 700 is equalized with the lower pressure in the now sealed profi 600, lid 620 sealed to high pressure containment housing 610. As illustrated, the pressure cartridge 700 is attached to a receiving port 630, which opens the contents of the pressure cartridge 700 to an interior volume of the profi 600. The sealing port 620 is optionally attached with a lock and key interface, such as a physical key shape of an end of the pressure cartridge 600 inserts into a lock element of the receiving port 630 or vise-versa. Similarly, an end or element of the pressure cartridge 600 screws into the receiving port 630 of the profi 600. Similarly, a slip connection and/or a regulator are optionally used as part of the receiving port. Generally, any attachment, physical interface, and/or accessory used to deliver gas(es) from the pressure cartridge 700 to the profi 600 is used as the receiving port 630. As illustrated, a valve 740 couples the receiving port 620 to the pressure cartridge 700. The valve 740 is optionally and preferably a pneumatic style valve, such as a Schrader valve. The valve 740 is optionally a one-way valve, which prevents flow of the cream 225 from the profi 600 into the pressure cartridge 700, which eases the process of repressurizing the cartridge 270 for reuse. The valve 740 is optionally affixed to the receiving port 620 and the pressure cartridge 700 is brought into contact with the valve 740 in the process of pressurizing the profi 250. Optionally and preferably, the pressure cartridge 700 is detached from the profi 600 in a step prior to the step of dispensing the whipped cream 260.

Still referring to FIG. 6A, the pressure cartridge 700 is optionally connected to a side or a bottom of the profi 600, which allows a gas or multiple gases from the headspace above a liquid in the pressure cartridge 700 to pass into the profi 600 without the liquid from the pressure cartridge 700 passing into the profi 600. For instance, nitrous oxide gas above a nitrous oxide liquid in the pressure cartridge 700 is passed into the profile, such as through a pressure charging port/valve.

Still referring to FIG. 6A, the dispensing elements of the profi 600 are further described. Generally, the profi includes a product dispensing port 660 and a trigger 650 for alternatingly opening and closing the dispensing port 660. As illustrated, the trigger 650 is a squeezable handle that when pulled on by the fingers of a hand grasping a handheld version of the profi 600 opens a dispensing valve in the dispensing port and by relaxing pressure on the handle, the dispensing valve is shut. When the dispensing valve is opened, the cream 225 and at least the nitrous oxide 352 are dispensed, where the nitrous oxide 352 introduced into the lower pressure of normal atmospheric pressure expands to form the whipped cream 262. Generally, the dispensing elements of the profi 600 include any trigger, button, and/or mechanical mechanism opening a path through the dispensing port 660 to allow passage of one or more contents in the profi 600 to a volume outside of the profi 600.

Optionally, the receiving port 620 is integrated into the dispensing port 660 where the pressure cartridge 700 is used to pressurize/charge the profi 600, the pressure cartridge is removed after a first seal is closed and the first seal and/or a second seal is mechanically/electromechanically opened, such as triggered by a button or lever, resultant in at least one content of the profi 600 being released through the first and/or second seal to an environment outside of the profi 600.

Referring again to FIG. 6B, the profi 600 is illustrated with a first receiving port 630 and a second receiving port 640, where the first and second receiving ports 630, 640 respectively attach to a first and second pressure cartridge 701, 702. Referring still to FIG. 6B and referring again to FIG. 6A, optionally and preferably the first pressure cartridge 701 is used to pressurize the profi 600 through the first receiving port 630 and, after detaching the first pressure cartridge 701 from the first receiving port 630, the second pressure cartridge 702 is used to further pressurize the profi through the first receiving port 630. Generally, the profi 600 contains any number m and n of receiving ports 630 and dispensing ports 660, respectively, where m and n are positive integers of 1, 2, 3, or more. Optionally and preferably the receiving port 630 is specified for pressures of 200, 300, 750, 1000, 2000, 3000, or more psi and the dispensing port operates at pressures up to 150, 175, or 200 psi. Optionally, any number of pressure cartridges 700 are sequentially used to pressurize the profi 600, such as for a single batch of cream 225, as further described infra.

Mixed Pressure Cartridges

Still referring to FIG. 6A, FIG. 6B, and FIG. 7, pressurizing the profi 600 with 1, 2, 3, or more mixed gas pressure cartridges and/or 1, 2, 3, or more single gas profi cartridges is described. Generally, if it is desired to pressurize the profi 600 with two or more gases, then the two or more gases are optionally provided in a single pressure cartridge or a first gas is introduced into the profi 600 via a first pressure cartridge 701 and a second gas is introduced into the profi 600 via a second pressure cartridge 702, either sequentially, such as via a single receiving port or in parallel via two receiving ports. Examples are used to describe the process of pressurizing the profi 250.

Example I

In a first example, it is desired to charge the profi 600 with two gases, such as nitrous oxide and nitrogen at a desired ratio. In a first case, the profi 600 is charged with a pressure cartridge 700 containing the desired ratio, as measured by partial pressures, moles, and/or mass, of nitrous oxide and nitrogen. In a second case, the profi 600 is pressurized through sequential attachment of a first pressure canister 701, such as filled with one of nitrous oxide or nitrogen, and attachment of a second pressure canister 702, such as the remaining element of nitrous oxide and nitrogen not in the first pressure container 701. In the second case, the desired ratio of the nitrous oxide and nitrogen is obtained by partial pressures, moles, and/or mass and/or through use of a first pressure in the first pressure container 701 and a second pressure in the second container differing from the first pressure by at least 0, 1, 2, 3, 4, 5, 10, or 15 percent. In a third case, the profi 600 is charged in parallel with a first pressure container 701 containing a first gas, such as nitrous oxide, connected to the first receiving port 630 and a second pressure container 701 containing the second gas, such as nitrogen, connected to the second receiving port. In the second and third cases, standard chemistry/physics equations relating pressure and concentration to volume are used to obtain the desired ratio/concentration/content of nitrous oxide and nitrogen, as measured by mass, percent volume, moles, and/or partial pressure. Naturally, any two gases are substituted for nitrous oxide and nitrogen in this example. Further, extension of this example allows pressurization of the profi 600 with 3, 4, 5 or more gases and/or air through 1 or more pressurization ports. In the described manner, the amount of each of a first gas, a second gas, a third gas, . . . , and/or an $n^{th}$ gas at time of pressurization is adjustable from 0 to 100 percent of the introduced gas, such as greater than 0, 1, 2, 3, 4, 5, 10, 15, 20, 25, 30, 35, 40, 45, 50, 60, 70, 80, or 90 percent of a given gas and less than 100, 99, 98, 97, 96, 95, 90, 80, 70, 60, 50, 40, 30, 20, or 10 percent of the given gas, such as any gas listed in Table 2.

Pressure Cartridge with Liquid Phase

Figure 8:
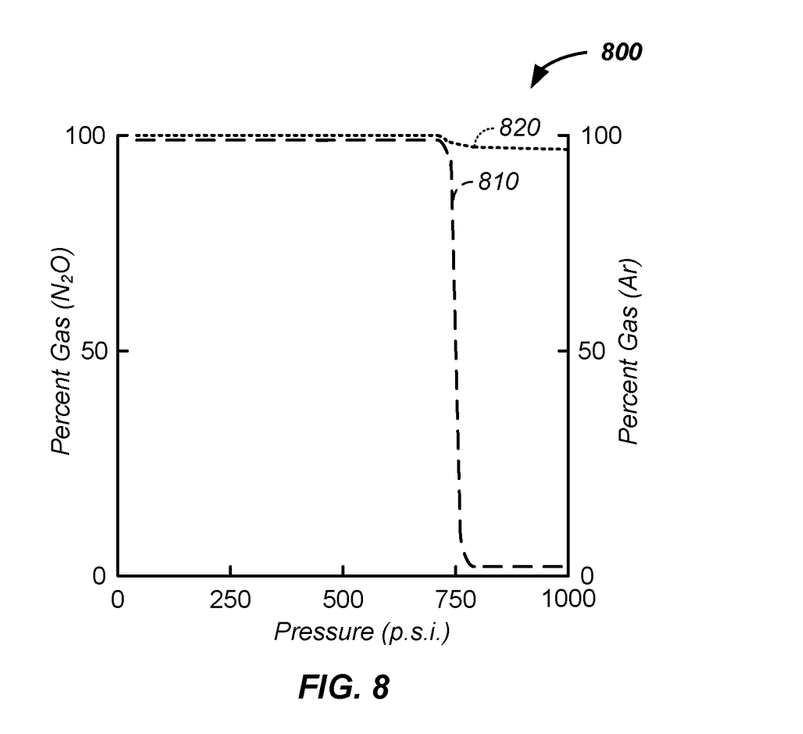
FIG. 8 illustrates a phase change of nitrous oxide.
Figure 9:
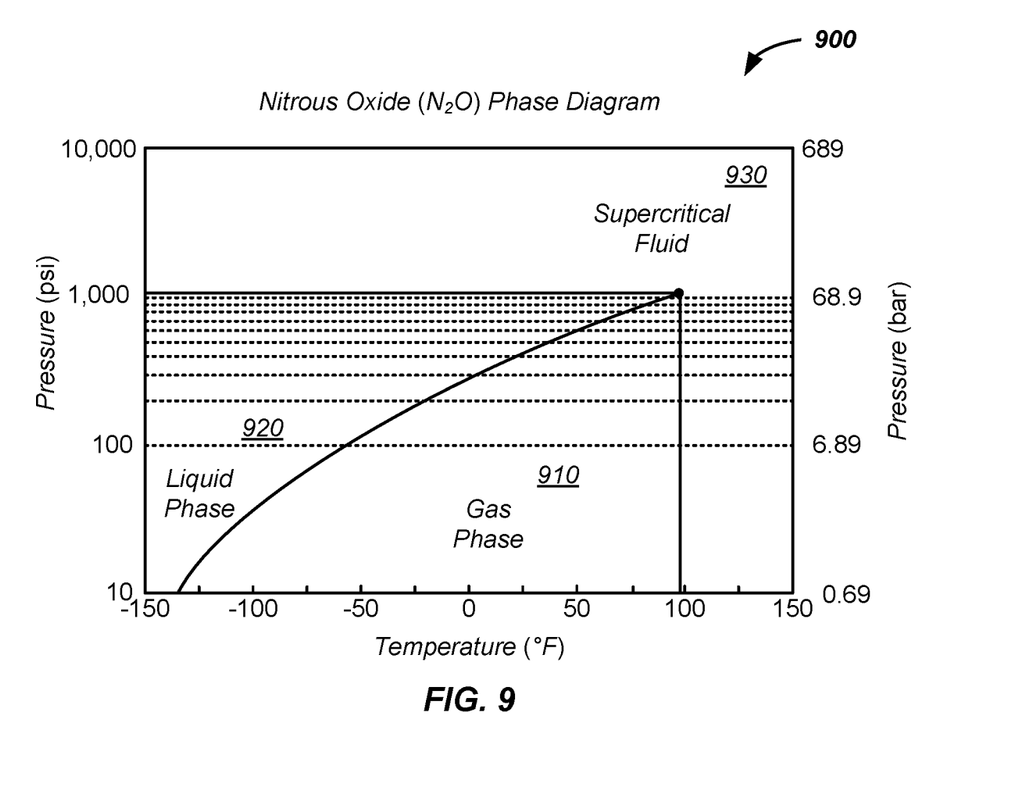
FIG. 9 illustrates a nitrous oxide phase diagram.

Referring again to FIG. 7 and referring now to FIG. 8 and FIG. 9, a pressure cartridge 700 containing a liquid form of one or more gases is described. For clarity of presentation and without loss of generality, nitrous oxide is used in examples of a pressure cartridge containing at least a liquid form of an atom or molecule that is a gas at standard temperature, 25° C., and pressure, 1 atm, though any one or more gases are optionally present in the pressure cartridge 700 in the form of a gas and/or a liquid. Referring now to FIG. 8, at pressures exceeding 750 psi, nitrous oxide is present as a liquid, while argon is still in a gas form from at least 750 to 1000 psi.

Referring still to FIG. 7, nitrous oxide 352 and argon 354 are in the pressurized cartridge 700. Further, as illustrated, the pressure in the pressurized cartridge has forced the nitrous oxide 352 to be at least in a liquid phase, such as in a liquid fraction 730 inside the pressurized container, and to optionally be in a gas phase, in a headspace gas fraction 720 inside the pressurized cartridge 700.

Referring now to FIG. 9, a nitrous oxide phase diagram 900 is presented. Notably, nitrous oxide transitions from a nitrous oxide gas phase 910 to a nitrous oxide liquid phase 920 at a pressure exceeding 750 psi at room temperature and is in a nitrous oxide supercritical phase 930 above 1000 psi, FIG. 9.

The pressure cartridge 700 is optionally maintained at a temperature and pressure where the nitrous oxide is in the form of a solid, liquid, or a supercritical fluid. When two or more gases are present in the pressure cartridge, the temperature and pressure are optionally set where each of the two or more gases are in a solid, liquid, or supercritical phase.

For the terms "for example" and "such as" and grammatical equivalences thereof, the phrase "and without limitation" is understood to follow unless explicitly stated otherwise. As used herein, the term "about" is meant to account for variations due to experimental error. All measurements reported herein are understood to optionally be modified by the term "about", whether or not the term is explicitly used, unless explicitly stated otherwise. As used herein, the singular forms "a," "an," and "the" include plural referents unless the context clearly dictates otherwise.

The clause "Atmospheric pressure" as used herein refers to ambient pressure of about 1 atmosphere (atm), or about 1 bar at sea level.

The clause "Room temperature" as used herein is about 25° C.

All percentages (%) are by weight unless indicated otherwise in a specific circumstance.

Optionally, any element of the container, such as a body of the container is printed using three-dimensional metal printing technology, such as in an additive manufacturing process.

Herein, a set of fixed numbers, such as 1, 2, 3, 4, 5, 10, or 20 optionally means at least any number in the set of fixed number and/or less than any number in the set of fixed numbers.

In still yet another embodiment, the invention comprises any combination and/or permutation of any of the elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. While single PWM frequency, single voltage, single power modules, in differing orientations and configurations have been discussed, adaptations and multiple frequencies, voltages, and modules may be implemented in accordance with various aspects of the present invention. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus for dispensing a whipped topping, comprising:
  a refillable container, comprising:
    a pressure containment housing;
    a first receiving port integrated into said pressure containment housing; and
    a dispensing port integrated into said pressure containment housing; and
  a first pressure cartridge comprising:
    an internal chamber pressurized in excess of two hundred fifty psi;
    a pressure gas delivery port; and an initial pressure, at time of manufacturing, maintaining at least a portion of an internally contained nitrous oxide in a liquid state, wherein a connection between said first receiving port and said pressure gas delivery port, at least temporarily, forms a pressure tight connection with an open path therethrough between said pressure containment housing and said first pressure cartridge, wherein said first pressure cartridge contains a mixture of nitrous oxide and at least one of nitrogen and a noble gas at a pressure between three hundred and three thousand psi.

2. The apparatus of claim 1, said pressure containment housing further comprising:
   a second receiving port configured to couple to a second pressure cartridge containing at least one of argon and nitrogen.

3. The apparatus of claim 1, said first receiving port further comprising:
   a one-way valve preventing contents of said containment housing from flowing into said first pressure cartridge.

4. The apparatus of claim 1, said first receiving port further comprising:
   a pneumatic valve.

5. An apparatus for dispensing a whipped topping, comprising:
   a refillable container, comprising:
      a pressure containment housing;
      a first receiving port integrated into said pressure containment housing; and
      a dispensing port integrated into said pressure containment housing; and
   a pressure cartridge comprising:
      an internal chamber pressurized in excess of seven hundred forty psi,
      a pressure gas delivery port;
      at least five percent by mass of each of the nitrous oxide, nitrogen gas, and argon gas; and
      at least one of neon, helium, krypton, hydrogen, and xenon at a concentration greater than 250 ppm,
   wherein a connection between said first receiving port and said pressure gas delivery port, at least temporarily, forms a pressure tight connection with an open path therethrough between said pressure containment housing and said pressure cartridge,
   wherein said pressure cartridge contains a mixture of nitrous oxide and at least one of nitrogen and a noble gas at a pressure between three hundred and three thousand psi.

6. An apparatus for dispensing a whipped topping, comprising:
   a refillable container, comprising:
      a pressure containment housing;
      a first receiving port integrated into said pressure containment housing; and
      a dispensing port integrated into said pressure containment housing; and
   a pressure cartridge comprising:
      an internal chamber pressurized in excess of two hundred fifty psi;
      a pressure gas delivery port; and
      both nitrogen and argon in a gas form at a concentration greater than 250 ppm and said nitrous oxide in a liquid form,
   wherein a connection between said first receiving port and said pressure gas delivery port, at least temporarily, forms a pressure tight connection with an open path therethrough between said pressure containment housing and said pressure cartridge,
   wherein said pressure cartridge contains a mixture of nitrous oxide and at least one of nitrogen and a noble gas at a pressure between three hundred and three thousand psi.

7. An apparatus for dispensing a whipped topping, comprising:
   a refillable container, comprising:
      a pressure containment housing;
      a first receiving port integrated into said pressure containment housing; and
      a dispensing port integrated into said pressure containment housing; and
   a pressure cartridge comprising:
      an internal chamber pressurized in excess of two hundred fifty psi;
      a pressure gas delivery port; and
      the nitrous oxide in a liquid phase and at least one of said nitrogen and said noble gas in a gas phase at a concentration of greater than 250 ppm,
   wherein a connection between said first receiving port and said pressure gas delivery port, at least temporarily, forms a pressure tight connection with an open path therethrough between said pressure containment housing and said pressure cartridge,
   wherein said pressure cartridge contains a mixture of nitrous oxide and at least one of nitrogen and a noble gas at a pressure between three hundred and three thousand psi.

\* \* \* \* \*